C. A. SANDS.
BUTTER AND FRUIT-JAR.

No. 189,390. Patented April 10, 1877.

WITNESSES:
A. W. Almquist
J. H. Scarborough

INVENTOR:
C. A. Sands.
BY Munn & Co.
ATTORNEYS.

UNITED STATES PATENT OFFICE.

CHARLES A. SANDS, OF BURLINGTON, KANSAS.

IMPROVEMENT IN BUTTER AND FRUIT JARS.

Specification forming part of Letters Patent No. 189,390, dated April 10, 1877; application filed December 30, 1876.

*To all whom it may concern:*

Figure 1:
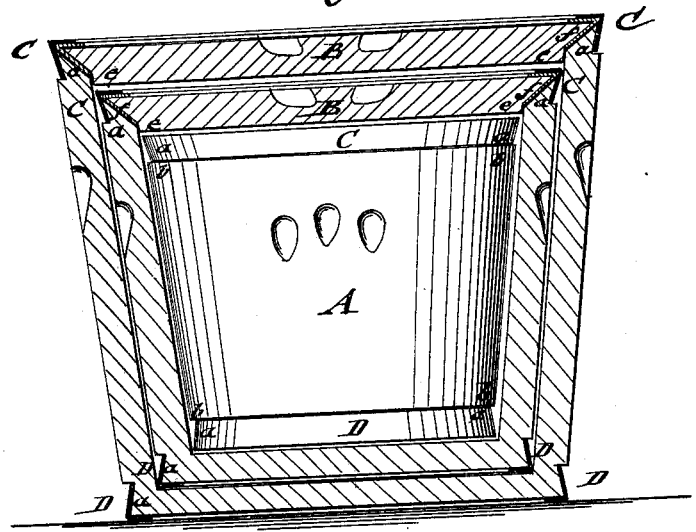
Figure 2:
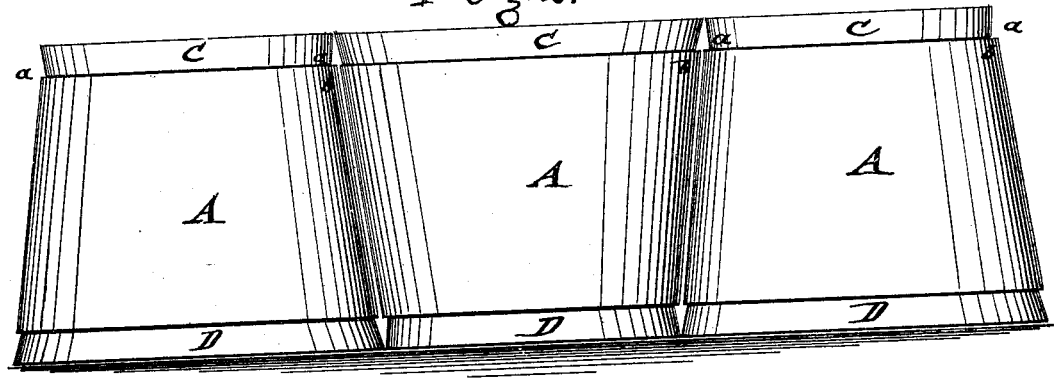

Be it known that I, CHARLES A. SANDS, of Burlington, in the county of Coffin and State of Kansas, have invented a new and Improved Butter and Fruit Jar, of which the following is a specification:

In the accompanying drawing, Figure 1 represents a vertical central section through a nest of my improved butter and fruit jars, and Fig. 2 a side elevation of several of my jars, showing mode of packing and shipping the same.

Similar letters of reference indicate corresponding parts.

This invention relates to such an improvement in butter and fruit jars that the contents are hermetically sealed therein, while the jars are capable of being directly packed into boxes for shipment without requiring any chaff or other packing material.

The improvement consists of a butter and fruit jar having beveled lid seated by an interposed rubber gasket on the tapering top edge of the jar, and being secured by a rubber band lapping over the lid and the recessed edge of the jar. The bottom edge of the jar has also a circumferential recess with a rubber band extending into the recessed part and lapping over the bottom edge to produce, in connection with the top band, protecting-cushions or packing for the jars.

In the drawing, A represents the body of my improved butter or fruit jar, which is made of earthenware, glass, porcelain, or other suitable material, and preferably of tapering shape.

The jar A is provided at the upper and lower edge of the body with circumferential recesses $a$ of triangular or other cross-section, that form a shoulder or collar, $b$, a short distance below the top and above the bottom edge. The upper edge of the jar is made tapering from the inside to outside to form a seat, into which the beveled edge of the lid B is fitted, which extends, by a cylindrical lower part, $e$, into the body of the jar. A rubber gasket, $f$, is interposed between the lid and the tapering rim of the jar, the gasket lapping over the edge of the lid to adhere more securely thereto. The lid B is firmly held in closed position by a rubber band, C, of suitable width and strength, which laps over the band $f$ and the edge of the lid, and over the edge of the body into the upper recess of the jar, so as to bind tightly on the lid and body, and secure the former in perfectly hermetical manner on the jar. The intimate closing of lid and jar admits the inverting of the same, so that the jar rests on the lid as a base when necessary for packing into as narrow a space as possible. A rubber band, D, is placed into the lower recess of the jar and lapped over the bottom edge for the purpose of forming jointly with the upper band cushions for the jars when the same are packed for shipment, they being alternately placed on the base or top, as shown in Fig. 2. No other filling or packing material for protecting the jars is required, while no putty or other sealing material or screws or fastening devices are necessary.

Jars of different sizes may be shipped in nests, as shown in Fig. 1, being protected in similar manner against injury by the crushing-bands. The jars may be conveniently filled, sealed, and opened, and preserve the contents in sweet and air-tight condition for any length of time.

Having thus described my invention, I claim as new and desire to secure by Letters Patent—

1. A butter or fruit jar, having the body A and bottom B connected by a compressible gasket and diagonal joint, the latter being covered on the outside by an elastic band, C, arranged as shown and described.

2. The jar A, having circumferential recess on lower edge and rubber band D lapping into recess and over bottom of jar, to form, in connection with top band, a cushioning packing for the jar, substantially as specified.

CHARLES A. SANDS.

Witnesses:
PAUL GOEPEL,
C. SEDGWICK.